(No Model.)
J. W. BOYNTON.
SPEED REGULATING DEVICE FOR LATHES.
No. 495,296. Patented Apr. 11, 1893.
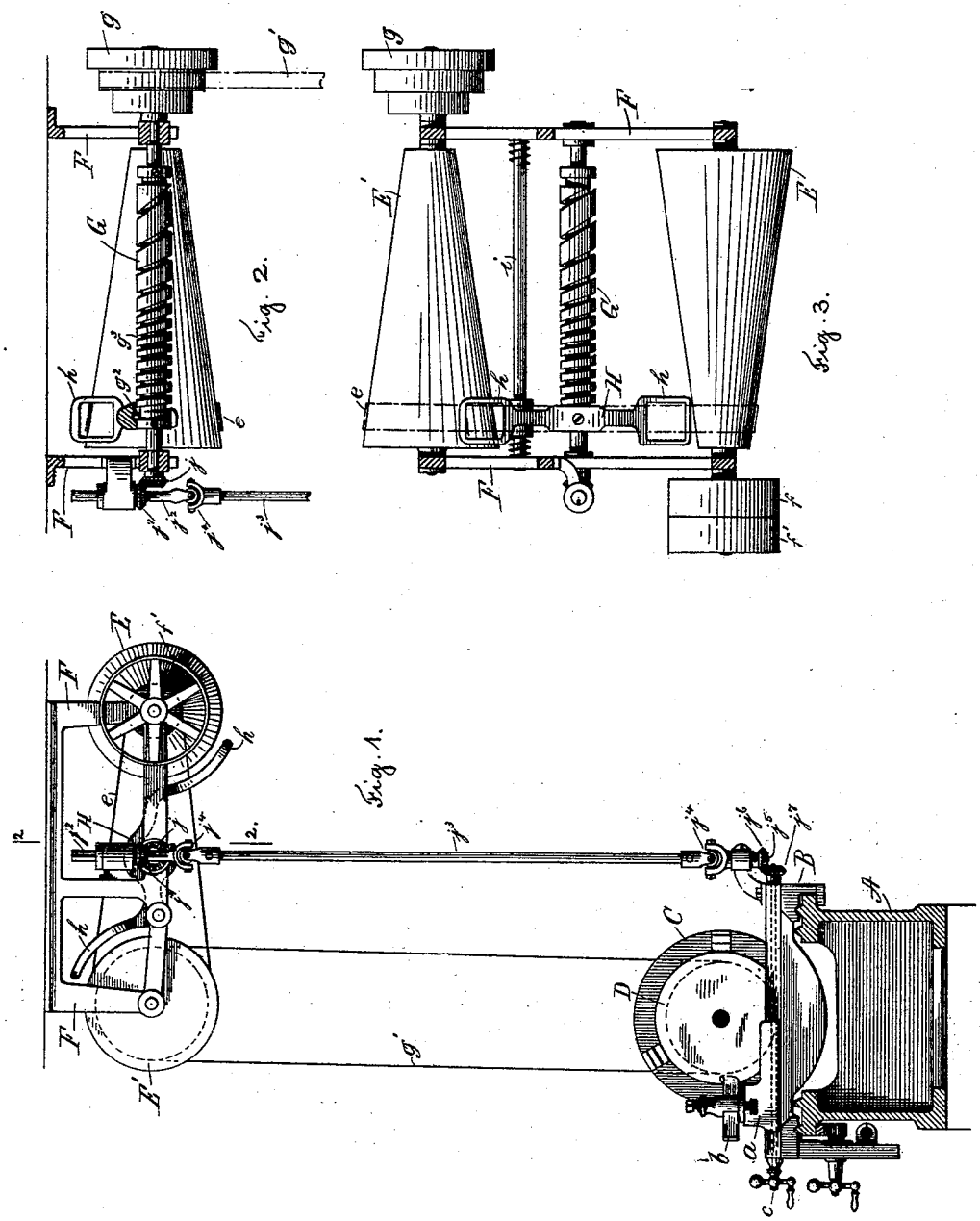
Witnesses
H. H. Thurston
S. J. Murphy
Inventor,
John W. Boynton

UNITED STATES PATENT OFFICE.

JOHN W. BOYNTON, OF PROVIDENCE, RHODE ISLAND, ASSIGNOR TO THE BROWN & SHARPE MANUFACTURING COMPANY, OF SAME PLACE.

SPEED-REGULATING DEVICE FOR LATHES.

SPECIFICATION forming part of Letters Patent No. 495,296, dated April 11, 1893.

Application filed March 4, 1892. Serial No. 423,702. (No model.)

*To all whom it may concern:*

Be it known that I, JOHN W. BOYNTON, of the city and county of Providence, in the State of Rhode Island, have invented certain new and useful Improvements in Speed-Regulating Devices for Lathes; and I do hereby declare the following specification, taken in connection with the accompanying drawings, forming a part of the same, to be a full, clear, and exact description thereof.

My invention relates to means for automatically changing or varying the speed of revolution of a piece of work under the action of a cutting or other tool, as for instance in an ordinary lathe. As is well understood, the surface speed of a revolving object varies at different distances from its center of revolution, such surface speed decreasing from the periphery of the object toward its center. As is also well known, this decrease of surface speed is not a uniform decrease, but is instead a variable decrease, the ratio of decrease being much more rapid as the center is approached. In operating upon a piece of work in revolution, as with a cutting tool for instance to cut off a rod of stock or to face a disk, the operation of cutting will necessarily be performed more and more slowly as the tool approaches the center of the work, if the work continue to be revolved at the same number of revolutions per minute throughout the operation, involving a consequent loss of time with each piece of work.

The object of the present invention is to provide means for automatically increasing the revolutions per minute of the work as the tool travels toward the center thereof, in proportion to the decrease in surface speed which would take place if no change were made in the number of revolutions.

To that end the invention consists in the combination, with the work spindle and its actuating mechanism, of speed varying devices, a helical cam or screw of varying pitch for controlling the action of said speed regulating devices, and mechanism for operating said cam or screw in unison with the tool slide, whereby as the cutting tool advances the surface speed of the work operated upon will be automatically maintained substantially uniform.

Referring to the drawings, Figure 1 is a view, partly in section, of so much of an ordinary lathe as is necessary to illustrate the present invention with my improvements applied thereto. Fig. 2 is a section on the line 2, 2, of Fig. 1, and Fig. 3 is a plan view of the speed regulating devices and the controlling cam or screw.

A represents the bed of the lathe, and B the tool carriage arranged to slide thereon, upon which tool carriage the tool slide $a$ carrying the tool $b$ is arranged to slide in the usual manner, said tool slide being operated by the cross-feed shaft $c$, which said shaft may be operated in any of the ordinary ways.

C represents a chuck attached to the work spindle, in which chuck the work D, being in this case a disk to be faced, is clamped. The speed regulating devices selected for illustrating the present invention consist of a pair of oppositely arranged speed cones E, E', carrying the connecting belt $e$. The shafts of these speed cones are mounted in suitable hangers F, F. The shaft of the cone E carries fast and loose pulleys $f, f'$, and the shaft of the cone E' carries a cone pulley $g$, from which latter pulley a belt $g'$ extends to the pulley upon the work spindle to drive the same.

G represents a helical cam or screw of varying pitch arranged between the cones E, E', as shown in Fig. 3, said cam being supported in suitable bearings in the hangers F, F. A belt shipper H having oppositely extending arms $h, h,$ is mounted to slide upon a rod $i$ secured in the hangers F. Projecting from this belt shipper is a stud or roller $g^2$ arranged to engage the groove $g^3$ on the cam G. The shaft of the cam G is provided at one end with a bevel gear $j$ which meshes with another bevel gear $j'$ upon a shaft $j^2$ journaled in a bracket projecting from one of the hangers F. The shaft $j^2$ is connected, by means of the shaft $j^3$ and universal joints $j^4$, with a short shaft $j^5$ journaled in a bracket attached to the tool-carriage B. This shaft $j^5$ carries a beveled pinion $j^6$ which meshes with a beveled pinion $j^7$ on the end of the cross-feed shaft $c$.

The operation of the parts is as follows: The work or disk D being clamped in the chuck C, and the tool slide being set so as to bring the tool b into proper position to act upon the face of the disk at its periphery, and the belt e being in the position shown in Fig. 3, and power being applied to the fast pulley f on the shaft of the cone E, the work will be revolved at a certain speed due to the position of the belt e on the speed cones, said speed being regulated to give the desired surface speed to the work at its periphery. As the cross-feed shaft c is revolved to move the tool b toward the center of the work, the cam G will, through the connecting mechanism above described, be correspondingly revolved, and the revolution of said cam G will, by reason of the engagement of the projecting stud on the belt shipper with the groove of said cam, cause said belt shipper H to be moved along said cam. This movement of the belt shipper will move the belt e along the speed cones, thus causing a change in the revolutions per minute at which the work will be revolved. The cam or screw G is constructed of a varying or increasing pitch, and so as to cause an increase in the number of revolutions per minute of the work in inverse ratio to the decrease in surface speed of the work at the point of the tool as the latter is advanced toward the center of the work which would take place if the revolutions per minute of the work remained unchanged.

As the result of the combination of parts above described, and as the result of the employment of a cam or screw of varying or increasing pitch, the belt e will be moved along the speed cones, not regularly, as would be the case if a screw of uniform pitch were employed, but instead will be moved with a constantly accelerated movement due to the increase in the pitch of the cam or screw G, and by reason of the ratio between the pitch of said cam and the law of decrease in the surface speed of the revolving work, the surface speed at the different points of the work from the periphery to the center will be automatically maintained uniform as the tool travels from the periphery to the center. Thus all parts of the work will be operated upon at substantially the same speed, and there will be no loss of time such as would be the case if no means were provided for so increasing the revolutions per minute of the work.

As above stated, the combination and arrangement of parts above described are applicable to various forms of machines, and will be found very useful in connection with cutting-off machines for cutting off a rod of stock.

What I claim as my invention, and desire to secure by Letters Patent, is—

1. The combination, with a work spindle and means for revolving the same of speed varying devices for varying the speed of revolution of said spindle, a helical cam or screw of varying pitch for controlling the action of said speed varying devices, a tool slide, and mechanism operated in unison with said tool slide for actuating said cam or screw, whereby the speed of revolution of the work spindle will be automatically varied in relation to the movement of the tool, substantially as described.

2. The combination with a work spindle and means for revolving the same of speed varying devices for varying the speed of revolution of said spindle, a helical cam or screw of varying pitch for controlling the action of said speed varying devices, a tool slide, and mechanism operated by the cross-feed shaft of said tool slide for actuating said cam or screw, whereby the speed of revolution of the work spindle will be automatically varied by and in relation to the movement of the tool, substantially as described.

3. The combination with a work spindle and means for revolving the same of speed varying devices consisting of a pair of speed cones and a belt connecting the same, a belt shipper for moving said belt, a helical cam or screw of varying pitch for operating said belt shipper, a tool slide, and mechanism operated in unison with said tool slide for actuating said cam or screw, whereby said belt will be moved along said speed cones in relation to the movement of the tool, substantially as described.

JOHN W. BOYNTON.

Witnesses:
W. H. THURSTON,
S. J. MURPHY.